(12) United States Patent
Hutton

(10) Patent No.: US 6,405,124 B1
(45) Date of Patent: Jun. 11, 2002

(54) SYSTEM AND METHOD FOR OFFSET COURSE GUIDANCE

(75) Inventor: Maurice F. Hutton, Niceville, FL (US)

(73) Assignee: Lockheed Martin Corporation, Owego, NY (US)

( * ) Notice: Subject to any disclaimer, the term of this patent is extended or adjusted under 35 U.S.C. 154(b) by 0 days.

(21) Appl. No.: 09/584,514

(22) Filed: May 31, 2000

(51) Int. Cl.[7] .............................. G06F 19/00; G06G 7/70
(52) U.S. Cl. ........................ 701/200; 701/14; 701/122; 701/210
(58) Field of Search ............................... 701/3, 4, 5, 10, 701/14, 15, 16, 17, 120, 122; 244/158 R, 181, 76 R, 183, 185; 342/33, 65; 33/361, 333, 356; 340/460, 977

(56) References Cited

U.S. PATENT DOCUMENTS

| 4,086,632 A | | 4/1978 | Lions ........................... 701/210 |
| 4,345,310 A | * | 8/1982 | Gautier ........................ 701/17 |
| 4,354,240 A | * | 10/1982 | Olive ............................. 701/4 |
| 4,692,869 A | * | 9/1987 | King et al. .................... 701/206 |
| 4,760,396 A | * | 7/1988 | Barney et al. ................ 342/65 |
| 4,825,374 A | * | 4/1989 | King et al. .................... 701/5 |
| 5,652,706 A | | 7/1997 | Morimoto et al. ........... 701/210 |
| 5,684,476 A | | 11/1997 | Anderson ................... 340/988 |
| 5,745,863 A | * | 4/1998 | Uhlenhop et al. ............ 701/14 |
| 5,802,727 A | | 9/1998 | Blank et al. ................... 33/361 |
| 6,005,581 A | * | 12/1999 | Gjullin ........................ 345/582 |
| 6,092,007 A | * | 7/2000 | Cotton et al. ................. 701/4 |
| 6,211,809 B1 | * | 4/2001 | Stiles ............................ 342/33 |

* cited by examiner

Primary Examiner—Jacques Louis Jacques
(74) Attorney, Agent, or Firm—Perkins, Smith & Cohen, LLP; Christine M. Kuta; Jacob N. Erlich

(57) ABSTRACT

In the present invention, an imaginary aircraft, called the "shadow aircraft," flies the original flight plan and, in turn, causes the true aircraft to fly the offset course. The offset course has the same number of legs as the original course, and for each leg of the original course, there is a corresponding parallel leg of the offset course. Except for an initial waypoint and a final waypoint, the locations of offset course waypoints are defined to be the intersections of the straight lines parallel to the original legs at the specified offset distance. The range and bearing to the offset course initial waypoint are chosen to be the same as the range and bearing to the next waypoint. For the interior legs of the flight plan, the lengths of the offset course legs vary from the corresponding "true" course leg. A maximum offset distance, a minimum offset course leg length, and an allowable region of transition are defined in the offset course system in order to be able to acquire and track a "flyable" offset course. The resulting system enables an aircraft to fly an offset course that is offset laterally from the true aircraft position without computing and storing offset course geometry in the form of latitude and longitude of the offset waypoints.

13 Claims, 8 Drawing Sheets

SYSTEM DIAGRAM

SYSTEM DIAGRAM

SYSTEM AND METHOD FOR OFFSET COURSE GUIDANCE

STATEMENT OF GOVERNMENT INTEREST

This invention was partially funded by the Government under a grant from the U.S. Army, Contract No. DAAJ09-94-C -0386(PDSS). The Government has certain rights in portions of the invention.

FIELD OF THE INVENTION

This invention relates generally to aircraft navigation, and, more particularly, to following a flight plan from an offset course position.

BACKGROUND OF THE INVENTION

An onboard computer on an aircraft contains guidance and flight director algorithms that permit the pilot to fly a flight plan by maneuvering the aircraft so that the flight director cues shown on the multi-function display (MFD) are nulled or centered. This approach permits the pilot to accurately follow an alternate flight plan parallel to the original flight plan with reduced workload. An autopilot, when the aircraft is so equipped, can also be used to accurately follow the alternate flight plan in place of the flight director. Hence, the offset course design to be described below is applicable to lateral control of an aircraft using either a flight director or an autopilot. The Army, however, discovered shortcomings in the current special operation aircraft (SOA) design for certain mission operations.

A first problem is presented when using the SOA system to fly multiple aircraft in formation where all the aircraft have the same flight plan stored in the onboard computers. A formation consists of a leader aircraft and one or more follower aircraft. Over the course of a mission, different aircraft from the formation may assume the role of the leader. Follower aircraft are commonly behind and offset laterally from the leader. For the current SOA design, the guidance function of the follower aircraft treats the desired lateral offset as a cross track error. Hence, the pilot of the follower aircraft cannot use the flight director or autopilot to fly an offset position because centering the lateral cue on the MFD forces the aircraft back onto the original flight plan leg.

Another problem in using the current SOA system is the lack of a simple procedure to quickly alter a portion of the flight plan while in flight as a means to get around large obstacles such as an unanticipated threat or a storm.

In the SOA guidance system, the flight plan is stored as a table in the mission management function. This table contains the waypoint coordinates (latitude and longitude) plus the desired ground speed and altitude for each leg of the flight plan. Lateral guidance compares the actual aircraft position and ground track angle estimated by the navigation function to the desired ground track. The resulting lateral guidance errors are the cross track distance, cross track velocity, and track angle error. In a similar manner, longitudinal and vertical guidance compute the speed error and altitude error, respectively, by comparing the aircraft speed and altitude to the desired speed and altitude for the current leg.

The guidance errors are inputs to the flight director control rules which in turn compute the steering cues displayed on the MFD. The pilot closes the flight control feedback loop by adjusting the cockpit flight controls (i.e., cyclic and collective inputs) to center the steering cues. When the cues are centered, the aircraft accurately follows the desired ground track, leg speed, and leg altitude. Digital avionics also provide the flight crew with a Horizontal Situation Display (HSD) showing a top down view of aircraft position relative to the flight plan ground track and waypoints.

An important aspect of the lateral guidance design is the logic controlling the turn from one flight plan leg to the next. The onboard computer automatically initiates turns onto the next leg at the proper time, and two types of turns are permitted. The particular turn choice for each destination waypoint is stored in the mission management function as part of the flight plan.

One choice of turn is a "flyover turn" where the switch to the next leg occurs when the aircraft "captures" the destination waypoint. Hence, the aircraft does not start turning until crossing the next leg. This means the flyover turn results in the aircraft overshooting the ground track of the next leg before getting back on course.

The other turn type is called "lead turn" where the aircraft smoothly rounds the corner formed by the adjacent flight plan legs. This is accomplished by starting the turn at a point prior to the destination waypoint where the turn point offset distance is a function of turn angle and the aircraft turn radius. Upon capturing this offset turn point, mission management switches to the next leg. The resulting flight director steering cues cause the pilot to roll the aircraft so that it rounds the corner with no overshoot of the next leg.

A first approach considered in solving the offset course guidance problems is based on constructing a second flight plan corresponding to the offset course. The transition from the original to offset course and vice versa was accomplished by switching between the two flight plans. This straightforward approach requires that the latitude and longitude of the offset waypoints be computed from the offset distance and the latitude and longitude of the original waypoints. The desired leg ground speeds would have to be recomputed because the leg lengths for the original and offset course are usually different. A first disadvantage of this method is the additional computer time and storage required to use explicit offset waypoints. A second disadvantage of this approach is the extensive effort required to modify the complex mission management software and validate the new design.

It remains desirable to have a system and method for following an offset course in an aircraft without having to explicitly modify or recompute the original flight plan.

It is an object of the present invention to provide a method and system that enables a pilot to fly an offset course as easily as flying an original course.

It is another object of the present invention to provide a method and system to make turning from a first flight plan leg in an offset course to a second flight plan leg in the offset course automatic and efficient.

SUMMARY OF THE INVENTION

The problems of establishing and following an offset course for aircraft are solved by the present invention of an offset course guidance system using a shadow aircraft.

In the present invention, an imaginary aircraft, called the "shadow aircraft," flies the original flight plan and, in turn, causes the true aircraft to fly the offset course.

The offset course has the same number of legs as the original course, and for each leg of the original course, there is a corresponding parallel leg of the offset course. Except for an initial waypoint and a final waypoint, the locations of offset course waypoints are defined to be the intersections of the straight lines parallel to the original legs at the specified offset distance. The range and bearing to the offset course initial waypoint are chosen to be the same as the range and bearing to the next waypoint. For the interior legs of the flight plan, the lengths of the offset course legs vary from the corresponding "true" course leg. A maximum offset distance, a minimum course leg length, and an allowable region of transition are defined in the offset course system in order to be able to acquire and track a "flyable" offset course. The resulting system enables an aircraft to fly an offset course that is offset laterally from the true aircraft position without computing and storing offset course geometry in the form of latitude and longitude of the offset waypoints.

The present invention together with the above and other advantages may best be understood from the following detailed description of the embodiments of the invention illustrated in the drawings, wherein:

DETAILED DESCRIPTION OF PREFERRED EMBODIMENTS

Figure 1:
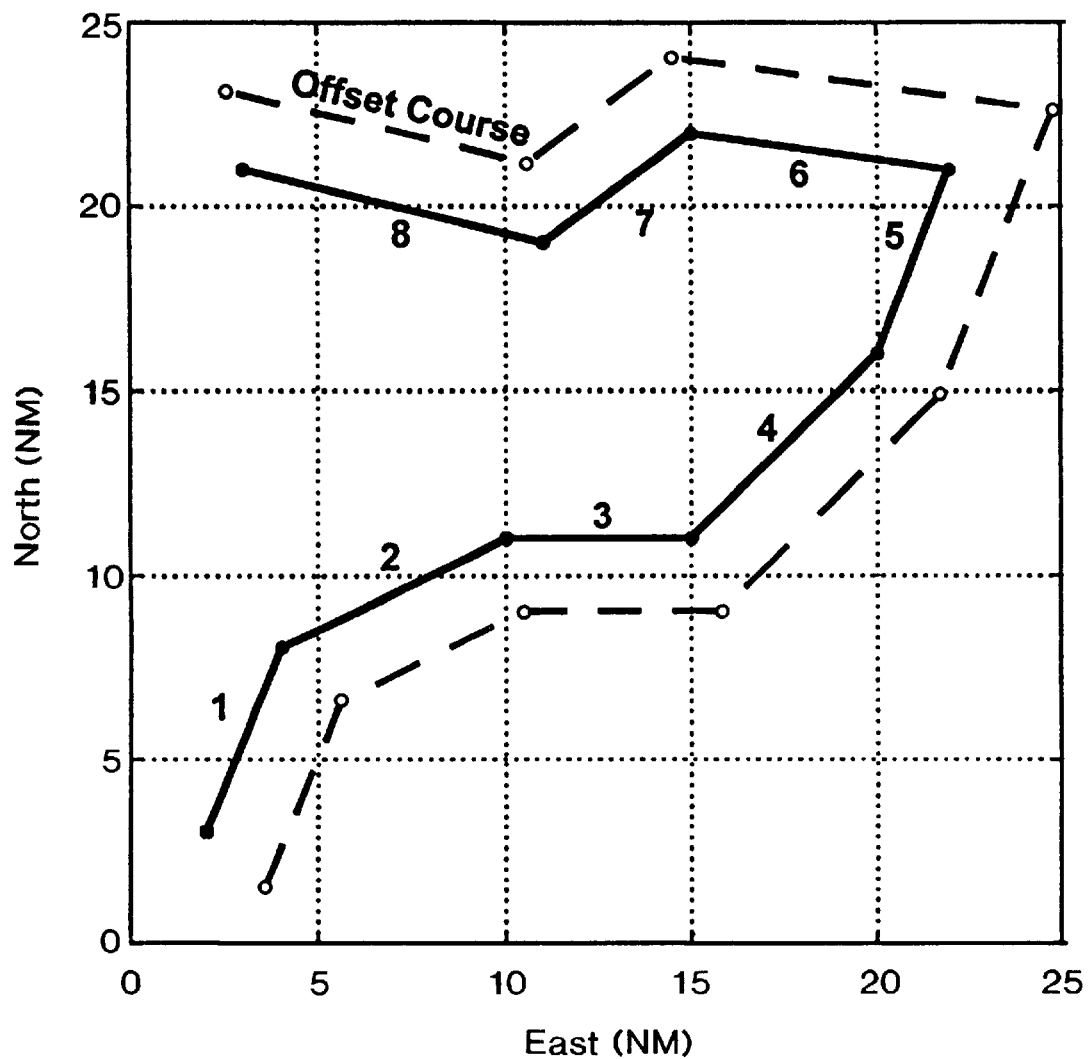
FIG. 1 is a diagram showing an original flight plan course and a first offset course.
Figure 2:
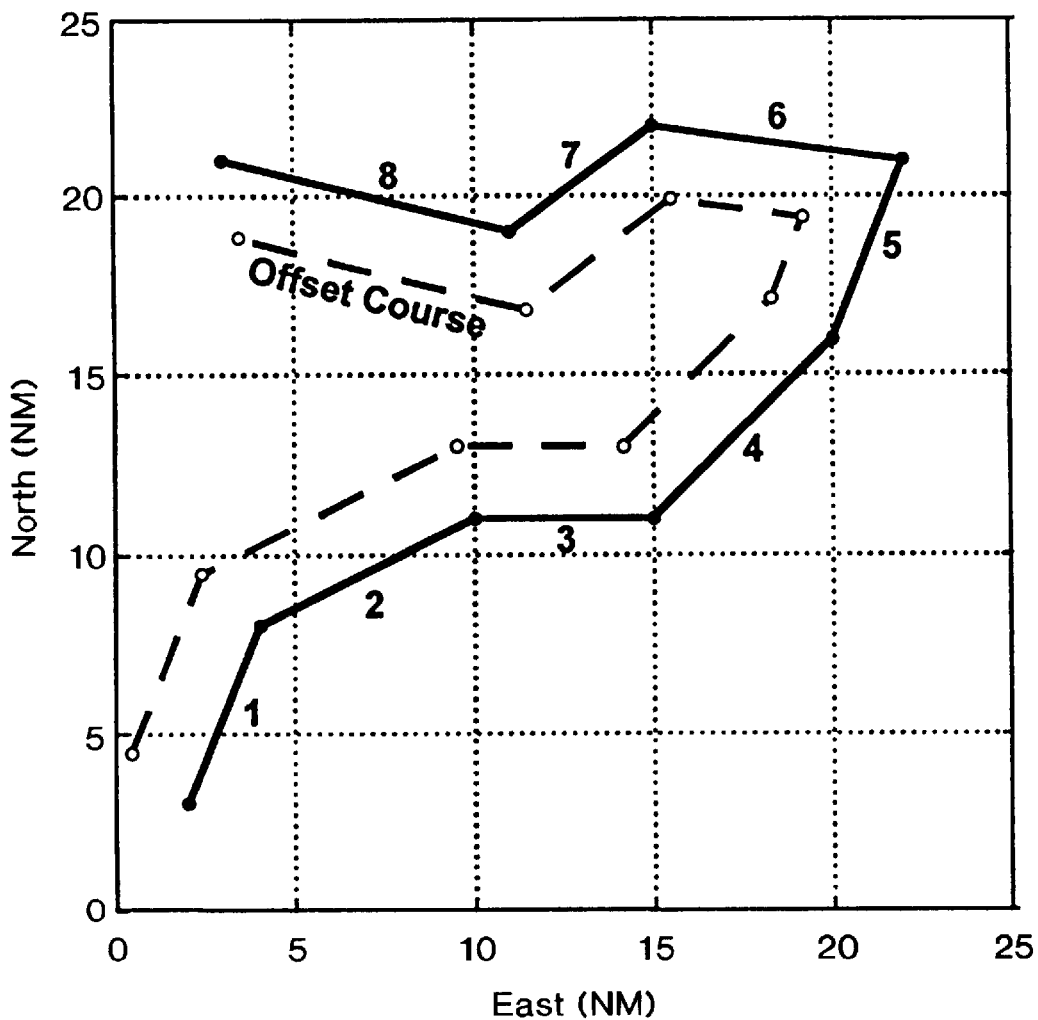
FIG. 2 is a diagram showing the original flight plan of FIG. 1 and a second offset course.

FIG. 1 is a diagram showing an original flight plan course and a first offset course. FIG. 2 is a diagram showing the original flight plan of FIG. 1 and a second offset course.

In the SOA guidance system, the flight plan geometry is specified as a sequence of up to 100 waypoints numbered 0 to 99 and stored in a Mission Management function, whose primary purpose is to specify the route and speed profile during the mission and specify the estimated time of arrivals (ETAs) for particular route locations. A waypoint is a point at which a course changes direction. A course has a starting point, a destination and generally one or ore waypoints in between the starting point and the destination. The sections between the points of a course are referred to as the "legs" of a course.

For the course guidance mode, the desired ground track is a sequence of great circular arcs interconnecting the waypoints. This reference guidance path based on the waypoints stored in Mission Management function is referred to as the "original course." The "offset course" is a course parallel to the original course and offset left or right a specified distance. The separation distance is measured perpendicular to the course direction.

FIG. 1 shows an example of the original course defined by the flight plan and a parallel course offset 2 nautical miles (NM) to the right. FIG. 2 shows the offset course for the same original course except the offset is 2 NM to the left instead of 2 NM to the right. In these two examples, the flight plan consists of eight legs numbered 1 through 8 in the direction of travel. In actual practice, the flight plan legs are generally much longer than those shown in FIGS. 1 and 2. Long legs do not present the design problems that short legs do. Hence, these examples were chosen to illustrate the capability of the resulting offset course system and method to cope with geometry related problems as will also be described below.

Figure 3:
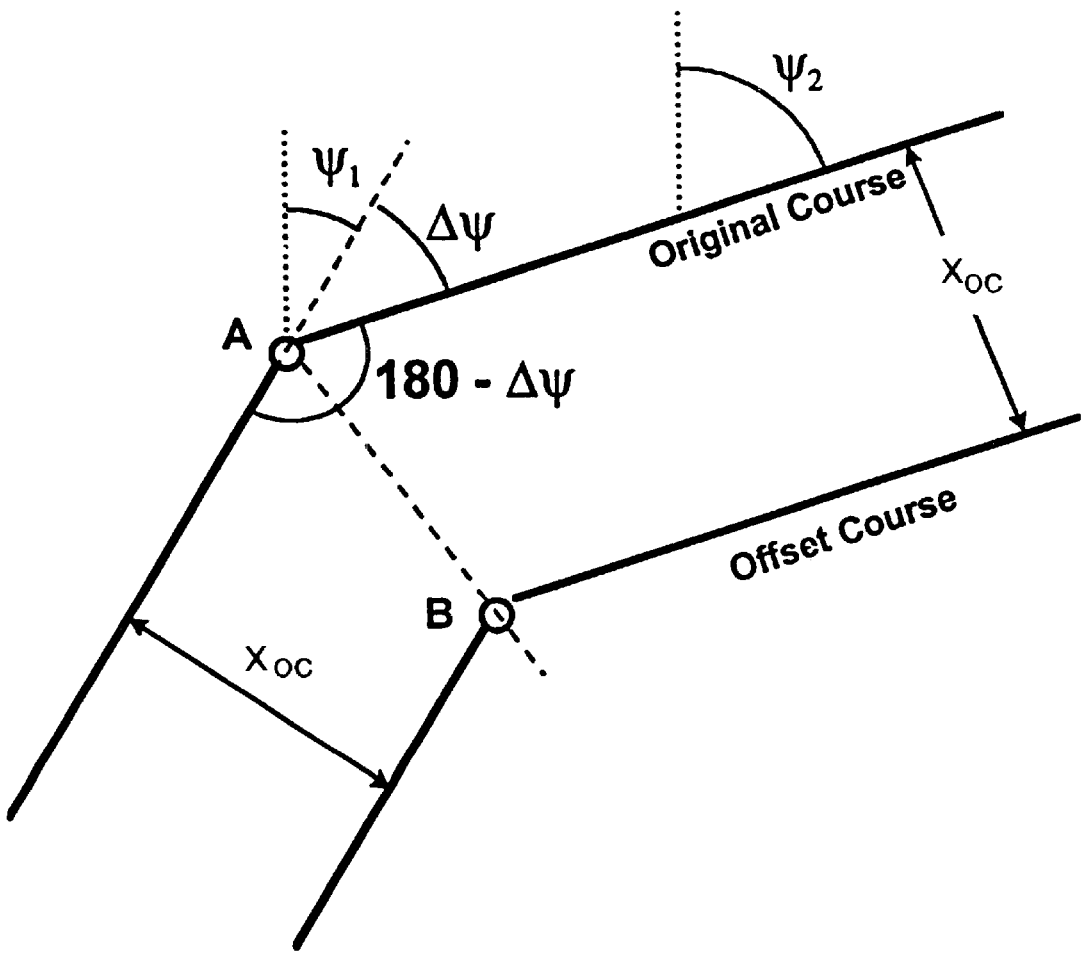
FIG. 3 is a diagram showing an original course, an offset course, and the measurements defining the offset course waypoint locations.

The offset courses have the same number of legs as the original course and for each leg of the original course there is a corresponding parallel leg of the offset courses. Hence, the legs of the offset courses are numbered in the same manner as the original course legs. Except for the initial and final waypoints, the locations of the offset course waypoints are defined to be the intersections of the straight lines parallel to the original legs at the specified offset distance. Based on the geometry shown in FIG. 3, the equations for computing the range and bearing of the vector from the original waypoint to the corresponding offset course waypoint are for the interior waypoints:

$$\text{Range} = X_{oc}/\cos(\delta\psi) \tag{1}$$

$$\text{Bearing} = \psi^* + 90° \text{ for Offset Right} \tag{2}$$

$$= \psi^* - 90° \text{ for Offset Left}$$

where
$X_{oc}$ is the offset distance, the distance from the original course measured perpendicular to the original course, $$\psi^* = (\psi_2 + \psi_1)/2 \tag{3}$$

$$\delta\psi = (\psi_2 - \psi_1)/2 = \Delta\psi/2 \tag{4}$$

The range and bearing to the offset course initial waypoint are chosen to be the same as the range and bearing of the next waypoint. Hence, the first legs of the original and offset course have the same length. Similarly, the range and bearing to the offset course final waypoint are chosen to be the same as the range and bearing of the prior waypoint, and hence, the last legs of the original and offset course have the same length.

For the interior legs of the flight plan, the lengths of the offset course leg and corresponding original course leg are usually different. For example, in FIG. 1, leg 5 of the offset course is longer than the original length and increases with offset distance.

In contrast, offset leg 5 in FIG. 2 is shorter than the original length and decreases with offset distance. In general, offset legs on the outside of turns increase in length with offset distance and offset legs on the inside of turns decrease with offset distance.

Offset legs that increase in length with offset distance do not present a problem. Offset legs that decrease in length with offset distance, however, do pose a potential problem. For example, if the offset distance in FIG. 2 was increased from 2 NM to 3.64 NM then the length of offset leg 5 would become exactly zero. Hence, offset leg 5 disappears for offset distances to the left greater than 3.64 NM. Further increasing the offset distance in FIG. 2 would eventually cause offset course legs 4 and 6 to also disappear.

Once the offset distance becomes large enough that an offset leg has zero length or disappears, then the one-to-one mapping property between original and offset course legs is no longer valid. In the preferred embodiment of the invention, the one-to-one mapping property is maintained for the portion of the offset course actually flown.

Since it was possible for the flight crew to select an offset distance and direction (left or right) that causes an offset course leg to become too short, a strategy to handle this problem needed to be devised. First, the minimum allowable length for each offset course leg is determined. The minimum offset course length cannot be any small fixed distance greater than zero. The minimum leg length needs to be sufficient to permit turns onto and off of the leg as accomplished by the guidance system.

Figure 4:
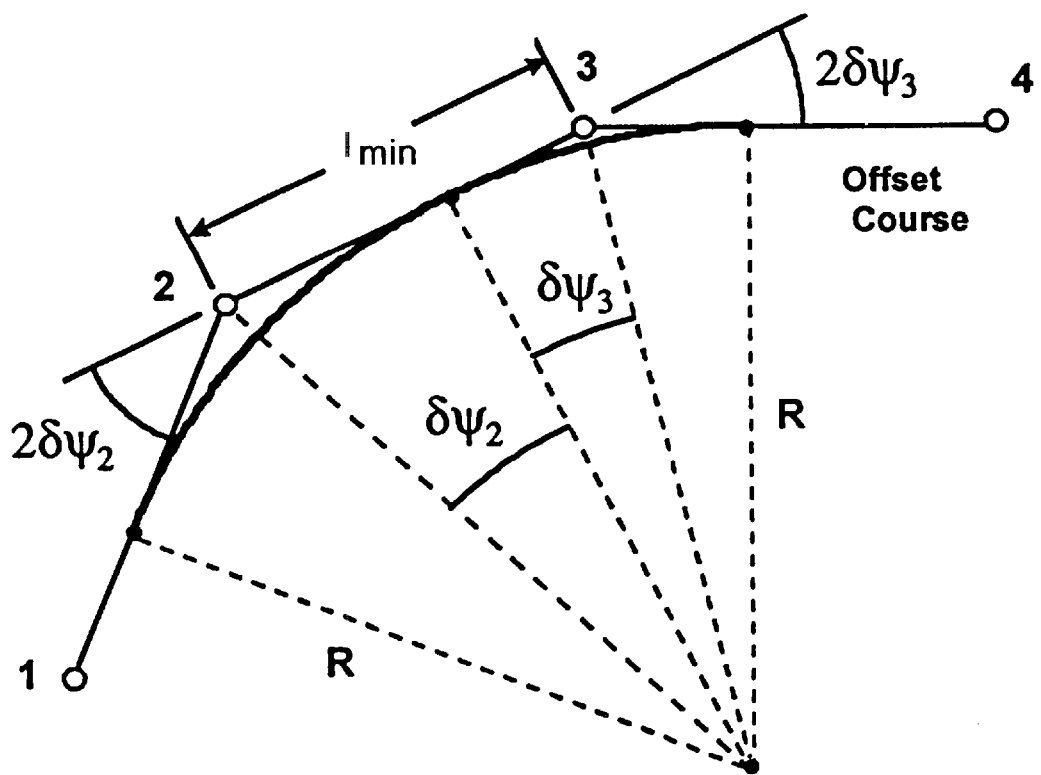
FIG. 4 is a diagram showing offset course measurements for determination of minimum course leg length.

FIG. 4 shows the minimum leg length $L_{min}$ necessary to successfully perform a lead turn onto and off of leg 2 connecting waypoints 2 and 3. Based on FIG. 4

$$L_{min}=R(|\tan(\delta\psi_2)|+|\tan(\delta\psi_3)|) \quad (5)$$

$$R=V/\omega \quad (6)$$

$$V=\max(V_1, V_2) \quad (7)$$

$$\omega=3 \text{deg/sec} \quad (8)$$

where

R=Turn Radius $V_K$=Speed for Leg K where K=1 or 2.

The desired turn rate 0) for a standard rate turn is 3 degrees per second.

Figure 5:
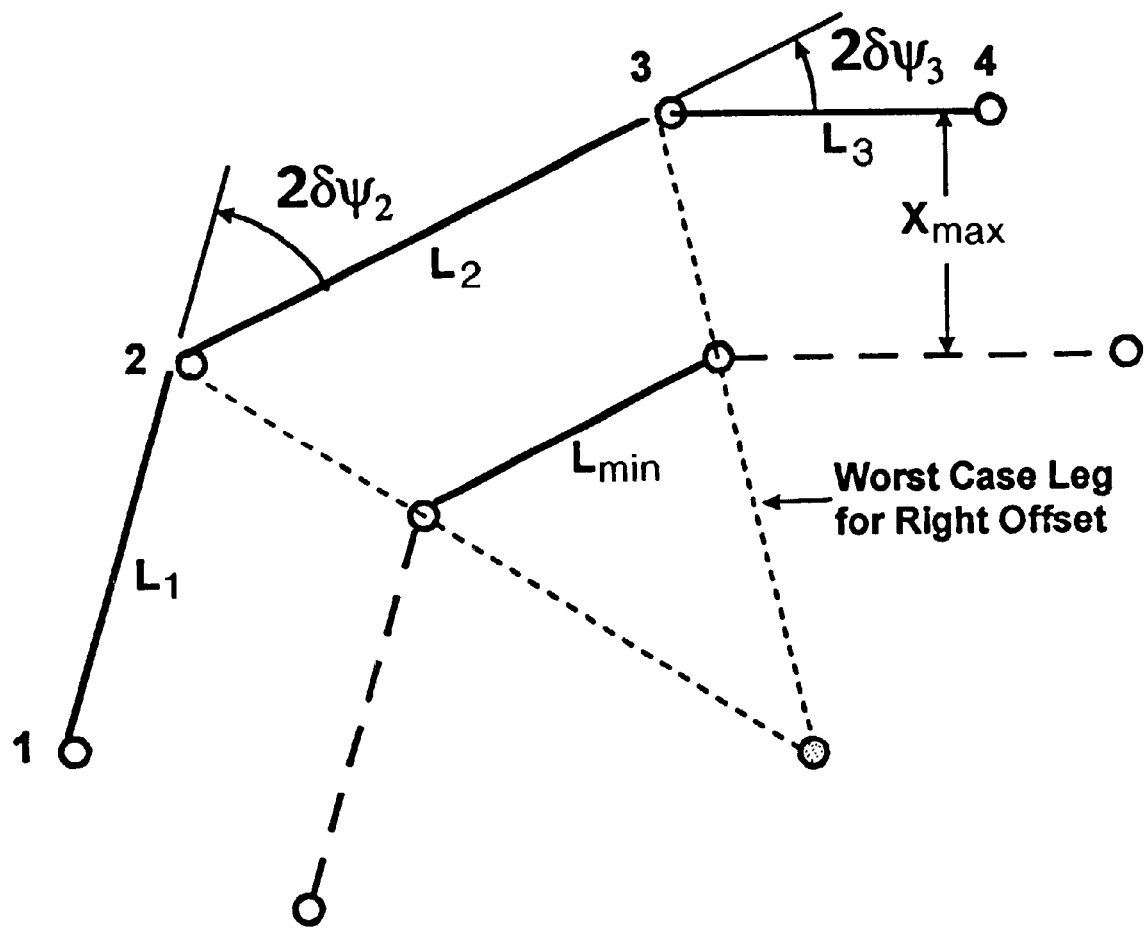
FIG. 5 is a diagram showing the geometric limit on maximum offset distance for the offset course.

The geometry relating the maximum allowable offset distance $X_{max}$ for leg 2 to the minimum offset course leg length $L_{min}$ for leg 2 is shown in FIG. 5. Based on FIG. 5, the equation for computing $X_{max}$ is $$X_{max}=(L_2-L_{min})/(\tan(\delta\psi_2)+\tan(\delta\psi_3)) \quad (9)$$

When the operator enters an offset distance $X_{oc}$, the offset course guidance algorithm uses equations similar to (5)–(9) to compute the maximum allowable offset distance $X_{max}$ for each flight plan leg in succession. The first leg encountered for which $X_{oc}>X_{max}$ causes the destination waypoint of the previous leg (i.e., last good leg) to become the final waypoint of the offset course. The number of this waypoint is displayed on the MFD via the following message:

OFFSET CSE 005 where in this instance 005 is the number of the final offset waypoint. If $X_{oc}<=X_{max}$ for all fight plan legs then the final offset waypoint is the last waypoint of the flight plan.

As long as the pilot initiates the return to the original course prior to reaching the final offset waypoint, there is no problem. If, however, the pilot continues on the offset course and captures the final offset waypoint then the lateral guidance mode will disengage and the following advisory message will appear on the MFD:

GUIDANCE DISENGAGE

In the present invention, the aircraft flies an offset course without explicitly computing and storing the offset course geometry (i.e., latitude and longitude of the offset waypoints). In the present invention, an imaginary aircraft, called the "shadow aircraft," flies the original flight plan and, in turn, causes the true aircraft to fly the offset course. The shadow aircraft is defined in the onboard computer by a set of variables representing its location and velocity. The values of these variables depends on the course offset. The shadow aircraft concept of this invention requires no changes to the mission management software resulting in significant savings in development cost and schedule.

The position of the shadow aircraft is offset laterally from the true aircraft position so that the relative displacement vector (from true to shadow aircraft) is equal to the displacement vector from the current destination offset course waypoint to the corresponding original course waypoint.

Figure 6:
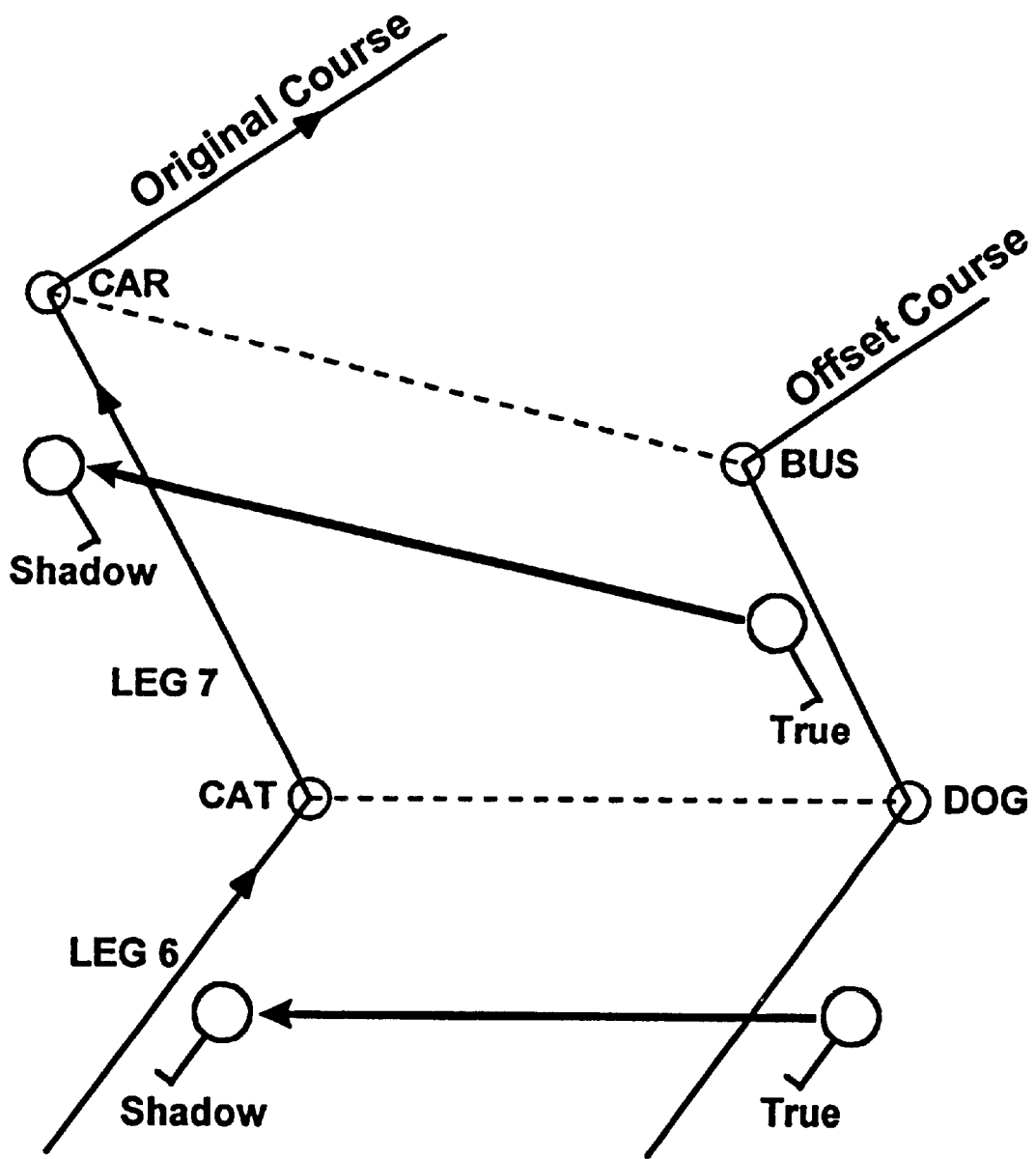
FIG. 6 is a diagram showing an original course and an offset course as flown by a shadow aircraft according to principles of the invention.

The geometry in FIG. 6 illustrates the procedure for locating the shadow aircraft. In FIG. 6, the lateral position vector from true to shadow aircraft is equal to the vector from waypoint "DOG" to waypoint "CAT" while flying leg 6 and is equal to the vector from waypoint "BUS" to waypoint "CAR" while flying leg 7. FIG. 6 also illustrates that the shadow aircraft relative displacement vector is constant over a flight plan leg but is different from leg to leg. It should also be noted that both aircraft have the same guidance errors and turn onto the next leg at the same time. The relative displacement vector varies from leg to leg due to a change in the along track distance between the shadow aircraft and the true aircraft. This change compensates for the difference in the leg lengths between the original and the offset course. The cross track component of the relative displacement vector is equal to the offset distance, and therefore, remains constant from leg to leg as long as the pilot does not change the offset. The relative displacement vector is computed at the start of a new leg using the following equations:

$$\Delta R_E=-R_W\sin(\beta_W) \quad (10)$$

$$\Delta R_N=-R_W\cos(\beta_W) \quad (11)$$

where $\Delta R_E$, $\Delta R_N$ are the east and north components of the relative displacement vector;

$R_W$ is the offset waypoint range computed in equation (1); and $\beta_W$ is the offset waypoint bearing angle computed in equation (2).

By design, the transition to the offset course begins at the moment when the operator enters the offset distance left or right via an onboard computer entry pad. Similarly, the transition back to the original course begins when the operator resets the offset distance to zero. Hence, the operator action required to start or terminate the offset course mode is simple and straightforward. At the start of the transition maneuver, the shadow aircraft has a cross track error equal to the offset distance. Lateral control logic, known in the art of flight navigation, is used to keep the shadow aircraft on the original course and causes the shadow aircraft via the flight director to fly back onto the same leg of the original course. As the shadow aircraft intercepts the original course with a desired intercept angle that is usually 45 degrees or less, the true aircraft intercepts the offset course by mimicking the shadow aircraft motion. Hence, no further changes to the offset course guidance design are needed to execute the transition maneuver as long as it terminates on the current leg.

Figure 7:
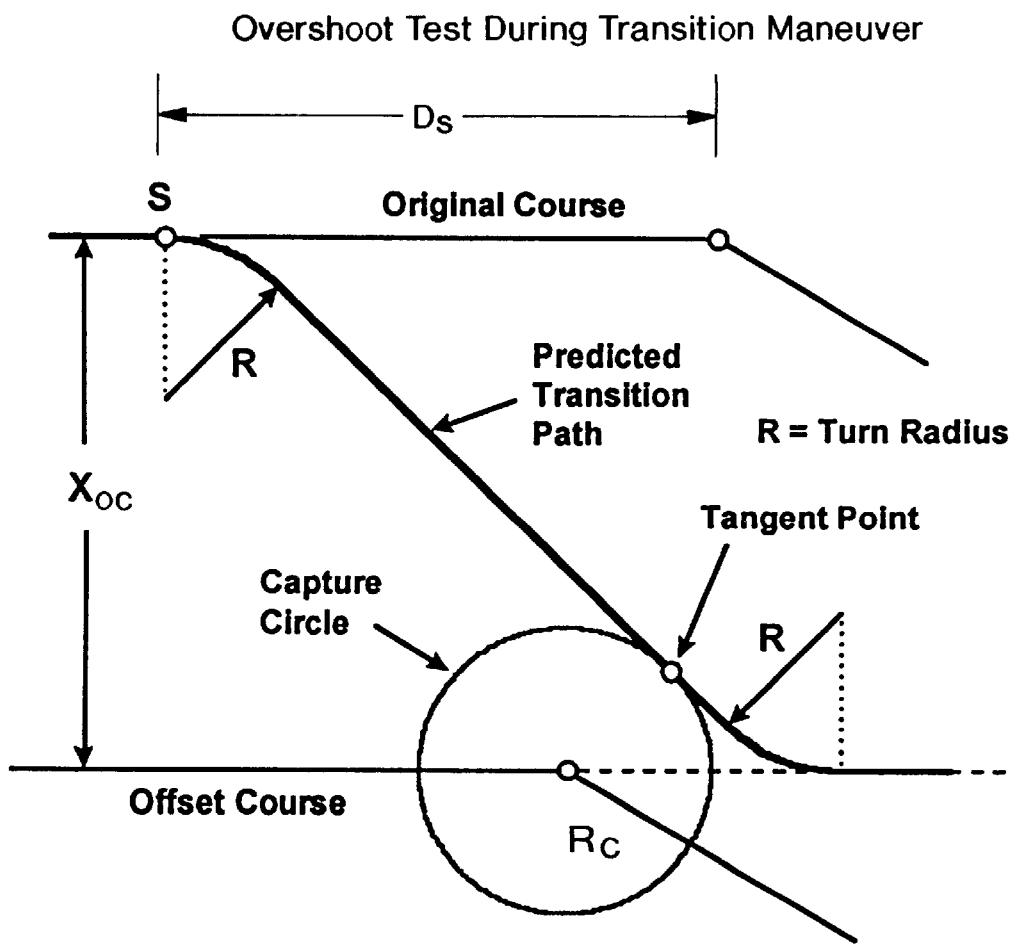
FIG. 7 is a diagram showing an original course, an offset course and an overshoot of the aircraft during a transition maneuver.

There are situations where it is not feasible for the transition maneuver to be restricted to the same leg. The first special problem occurs when the aircraft is close to switching to the next leg at the time the operator initiates the offset course mode. In this case, the true aircraft will fly past the offset course destination waypoint prior to reaching the offset course, and consequently, never turns onto the next leg of the offset course. FIG. 7 illustrates the limiting case geometry for a flyover type turn. This problem will occur when the operator initiates the offset course mode after the aircraft has flown past point S shown in FIG. 7. Point S is, by definition, the point on the current leg of the course specifying the allowable region of transition maneuvers to the same leg of the offset course. In other words, the transition maneuver must be initiated prior to reaching point S in order for the aircraft to capture the corresponding leg of the offset course.

The computation of point S is based on the geometry defining when capture of the next offset course waypoint will occur. For the SOA aircraft, capture will occur when the aircraft flies into the capture circle which is a circle of a pre-specified radius centered about the current offset course destination waypoint. Also for the SOA aircraft, the nominal intercept angle to a new course is 45 degrees and the turn radius R is a known function of the aircraft airspeed. Using these facts and the offset course geometry, the location of point S is found by extrapolating backwards from the tangent point of the capture circle corresponding to the 45 degree intercept course as shown in FIG. 7. The location of point S is specified by the distance $D_S$ from point S to the next destination waypoint along the original course as illustrated in FIG. 7. The equation for computing this distance is $$D_S = (1 + \tan(\Delta\Psi))X_{OC} + (\sqrt{2}-1)R - \sqrt{2}R_C \qquad (12)$$

where $X_{OC}$ is the offset distance of equation (1);

$\Delta\Psi$ is the turn angle of equation (4);

R is the turn radius of equation (6); and $R_C$ is the radius of waypoint capture circle.

If a lead turn is in effect, then point S will be further back from the destination waypoint making this problem even more likely. This problem is solved by first using the geometry in FIG. 7 to predict the location of point S. If the pilot initiates the offset course guidance mode prior to the aircraft reaching point S, then normal lateral guidance with no modifications applies. If, however, the aircraft is beyond point S when the offset course guidance mode is initiated, the offset course guidance algorithm causes mission management to immediately sequence to the next leg of the flight plan. Hence, this situation causes the aircraft to transition directly to the next offset leg instead of the current offset leg. The same lateral control logic in the flight director function or autopilot still applies. The only change upon switching legs is the geometry of the current flight leg. The message "OFFSET NEXT LEG" appears on the MFD advising the pilot that this abnormal sequence to the next leg has occurred.

The second problem is an extension of the first problem and occurs when the aircraft is beyond point S in FIG. 7 at offset mode start and the next leg is so short relative to the offset distance that the aircraft is going to fly past the destination waypoint of the next offset course leg before intercepting the next leg. The geometry for this problem is the same as the geometry shown in FIG. 7 except the original course is not parallel to the offset course. Also, the initial turn upon departing the original course is 45+$\Delta\Psi$ degrees instead of 45 degrees where $\Delta\Psi$ is the change in direction between the current leg and next leg as defined in equation (4). Based on the new geometry, the point S moves to a new location on the original course that is closer to the current leg destination waypoint. In this case, the equations for computing the distance $D_S$ from point S to the current leg destination waypoint are:

$$A = \cos(\Delta\Psi) - \sin(\Delta\Psi) \qquad (13)$$

$$B = \cos(\Delta\Psi) + \sin(\Delta\Psi) \qquad (14)$$

$$D_S = (AX_{OC} - D_{NL} + (\sqrt{2}-A)R - \sqrt{\sqrt{2}R_C})/B + X_{OC}\tan(\Delta\Psi/2) \qquad (15)$$

where $D_{NL}$ is the length of the next offset course leg;

$X_{OC}$ is the offset distance;

$\Delta\Psi$ is the turn angle from the current leg to the next leg;

R is the turn radius; and $R_C$ is the radius of the waypoint capture circle. The aircraft must initiate the transition maneuver prior to reaching the new point S in order to capture the next leg of the offset course.

As before, the aircraft must initiate the transition maneuver prior to reaching the new point S in order to capture the next leg of the offset course. If this geometry test predicts the aircraft will not intercept the next offset course leg prior to the turn point, additional logic displays the message "OFFSET IMPOSSIBLE" on the MFD and resets the offset course distance to its previous value. This action forces the flight crew to assess the situation and take the appropriate action. This design approach is taken for this particular transition overshoot problem because it is unlikely to occur and difficult to determine the appropriate corrective action a priori.

It should be noted that the tests for the two transition overshoot problems described above are based on the "predicted" aircraft lateral trajectory. Even when successful intercept of the destination offset course leg is predicted, it is still possible for the aircraft to fail to intercept the designated offset course leg prior to reaching the turn point onto the following leg. To handle this situation, a special flag is set when it is determined that the aircraft has flown past and will never capture the next scheduled turn point. When this flag is set, lateral guidance disengages and the message "GUIDANCE DISENGAGE" appears on the MFD.

Figure 8:
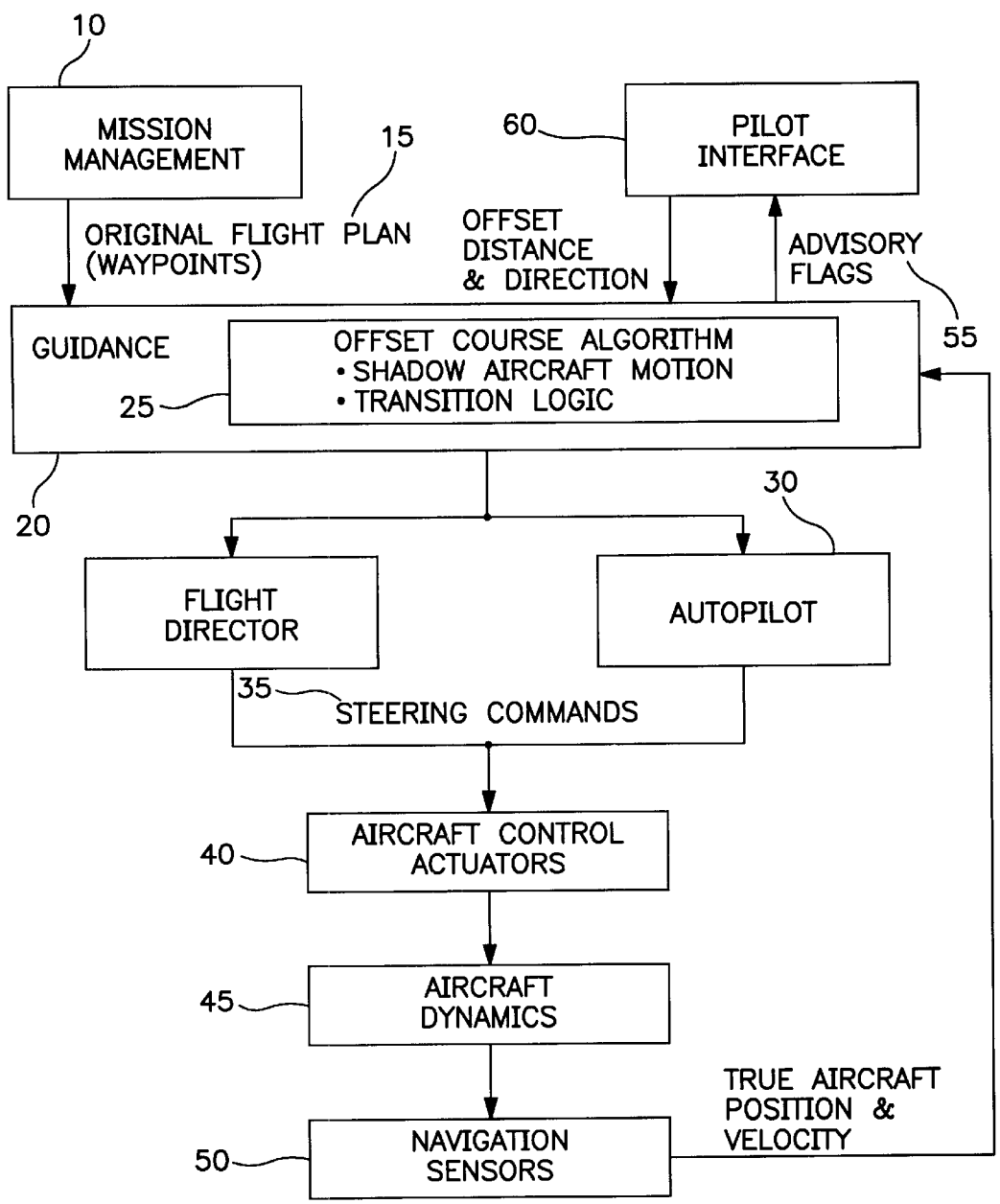
FIG. 8 is a block diagram of the offset course guidance system of the present invention.

A system diagram in FIG. 8 illustrates how the present invention could be integrated into a new or existing digital avionics system to fly an aircraft along an offset course. This mission management function 10 outputs the original flight plan 15 which is usually stored as a sequence of waypoints. The flight plan is also likely to specify the flight legs speeds and/or waypoint arrival times. The flight crew initiates the offset course guidance mode by simply entering the offset distance and direction (left or right) into the avionics computer 20 having the offset course guidance logic 25. This data together with the flight plan data and true aircraft position and velocity is used by offset course algorithm to compute the shadow aircraft position and velocity. The shadow aircraft along track and cross track errors are computed by comparing the shadow aircraft position and velocity to the original flight plan. These shadow aircraft guidance errors are used by the aircraft flight director or autopilot 30 to generate the steering commands 35. The steering commands cause the true aircraft to alter its motion via the aircraft actuators 40 and aircraft dynamics 45 so that the shadow aircraft guidance errors converge to zero which in turn cause the true aircraft to capture and track the offset course. The navigation sensors 50 measure the true aircraft position and velocity which are fed back to the guidance function in the avionics computer 20. The offset course logic 25 also contains special transition logic described previously for solving the unique problems associated with transitioning from the original course to the offset course and visa versa. The offset course logic 25 generates advisory flags 55 used to alert the crew of the mode status through a pilot interface 60. The flight crew are able to make any corrections that may be necessary.

It is to be understood that the above-described embodiments are simply illustrative of the principles of the invention. Various and other modifications and changes may be made by those skilled in the art which will embody the principles of the invention and fall within the spirit and scope thereof.

What is claimed is:

1. An aircraft navigation system, comprising:

means for establishing an original course;

means for establishing an offset course, said offset course offset by a predetermined distance from said original course; and a shadow aircraft to follow said original course while an actual aircraft follows said shadow aircraft, said actual aircraft maintaining said offset distance from said shadow aircraft.

2. The system of claim 1 wherein said offset is measured perpendicular from said original course.

3. The aircraft navigation system of claim 1, wherein said means for establishing an offset course further comprises means for determining a relative displacement vector.

4. The aircraft navigation system of claim 1 further comprising:

a means for establishing a minimum offset course leg length and an associated maximum allowable offset, said means for establishing a minimum offset course leg length adjusting said offset in response to a course leg length shorter than said minimum offset course leg length.

5. The aircraft navigation system of claim 1 further comprising:

means for determining whether, after initiation of the offset course, the aircraft will capture a current offset course leg before reaching a next destination waypoint, said determination made in response to a predicted aircraft transition path.

6. The aircraft navigation system of claim 5, wherein said means for determining further comprises a capture circle defined at said next destination waypoint whereby said aircraft is predicted to acquire said current offset course leg if the aircraft is predicted to intersect said capture circle and the aircraft is predicted to fail to capture said current offset course leg if the aircraft is predicted to miss said capture circle.

7. The system of claim 1, further comprising:

means for establishing a plurality of offset courses, said offset courses determined by predetermined distances from said original course, said predetermined distances enabling a plurality of aircraft to fly in formation; and said shadow aircraft to follow said original course while said plurality of aircraft follow said shadow aircraft in formation.

8. A method of following an offset course in an aircraft, comprising the steps of:

setting an original course;

setting an offset course by setting an offset distance from the original course; and flying a shadow aircraft along said original course and following said offset course in an actual aircraft.

9. The method of claim 8 wherein said step of flying said shadow aircraft further comprises maintaining a relative displacement vector between said actual aircraft and said shadow aircraft is equal to the displacement vector from a current destination offset course waypoint to a corresponding waypoint of said original course.

10. The method of claim 8 further comprising the steps of:

establishing a minimum offset course leg length;

determining a maximum allowable offset in response to said minimum offset course leg length; and adjusting said offset while navigating a course leg shorter than said minimum offset course leg length according to said maximum allowable offset.

11. The method of claim 8, further comprising the step of:

determining whether, after initiating the offset course, the aircraft will capture a current offset course leg before reaching a next destination waypoint from a predicted aircraft transition path.

12. The method of claim 11 further comprising the steps of:

setting a capture circle at each waypoint;

establishing an offset from a current course leg if an offset course is initiated while the aircraft is predicted to enter said capture circle; and establishing an offset from a next course leg if an offset course is initiated while the aircraft is predicted to bypass said capture circle.

13. The method of claim 8, further comprising the steps of:

setting a plurality of offset courses by setting a plurality of offset distances from said original course, said plurality of offset distances forming a formation pattern; and following said shadow aircraft in a plurality of actual aircraft flying in formation, each said aircraft having its own offset distance.

* * * * *